April 13, 1926. 1,580,679
E. ROUČKA
REMOTE MEASURING FLOW METER
Filed Sept. 30, 1922 2 Sheets-Sheet 1

INVENTOR
Erich Roučka,
BY
Everett H Rook,
ATTORNEYS.

April 13, 1926.
E. ROUČKA
1,580,679
REMOTE MEASURING FLOW METER
Filed Sept. 30, 1922　　2 Sheets-Sheet 2
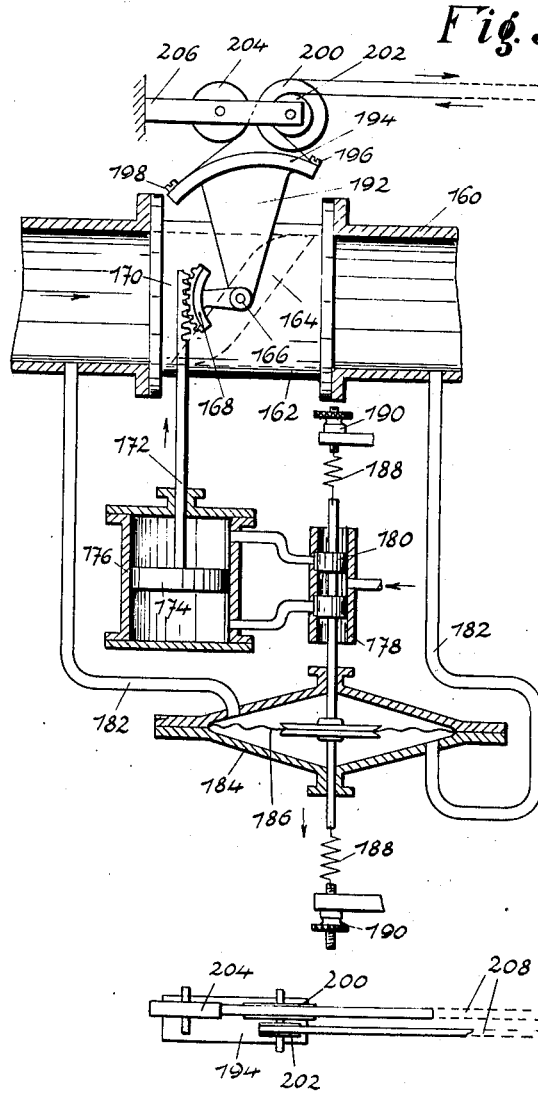
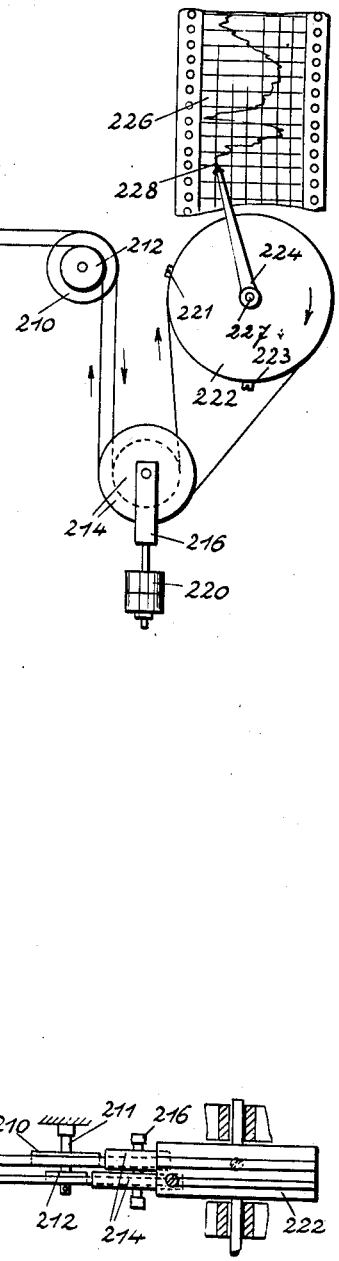
Fig. 3
Fig. 4
INVENTOR
Erich Roučka,
BY
Everett N Rook,
ATTORNEYS.

Patented Apr. 13, 1926.

1,580,679

UNITED STATES PATENT OFFICE.

ERICH ROUČKA, OF BLANSKO, CZECHOSLOVAKIA.

REMOTE MEASURING FLOW METER.

Application filed September 30, 1922. Serial No. 591,499.

*To all whom it may concern:*

Be it known that I, ERICH ROUČKA, a citizen of the Republic of Czechoslovakia, and a resident of Blansko, Czechoslovakia, have invented new and useful Improvements in Remote Measuring Flow Meters, of which the following is a specification.

This invention relates to fluid flow measuring systems of the balanced valve type which includes flow resisting means which is variable as a function of the magnitude of flow of fluid therethrough.

The primary object of the invention is to provide such as system including means for transmitting the controlling or measuring movements to a point remote from the flow meter, and means at said remote point for indicating, recording or integrating the flow of fluid or for other purposes.

In accordance with the invention the transmission may be made mechanically by means of a rigid or flexible connection, or by means of an auxiliary condition, for instance, fluid, variable pressure, difference in pressure, flow of fluid, fluid impulses or vibrations, variable volume of fluid container, etc., or electrically by variable current, tension, resistance, wattage, frequency, synchronous devices, impulse, etc.

The transmitting may be direct, for instance, the pilot motor of the flow meter may vary the transmitting condition or means, such as electric current, or the transmitting may be indirect by means of balancing devices actuated by auxiliary energy.

Referring to the accompanying drawings, in which like numerals of reference indicate the same parts throughout the several views, Figure 1 is a schematic illustration, partially in section and partially in side elevation, of a fluid flow meter embodying my invention;

Figure 3 is a schematic illustration of another type of fluid flow meter embodying a further modification of my invention, and Figure 4 is at top plan view of the mechanism for transmitting the motions of the flow meter to a point remote from the flow meter shown in Fig. 3.

Figure 1:
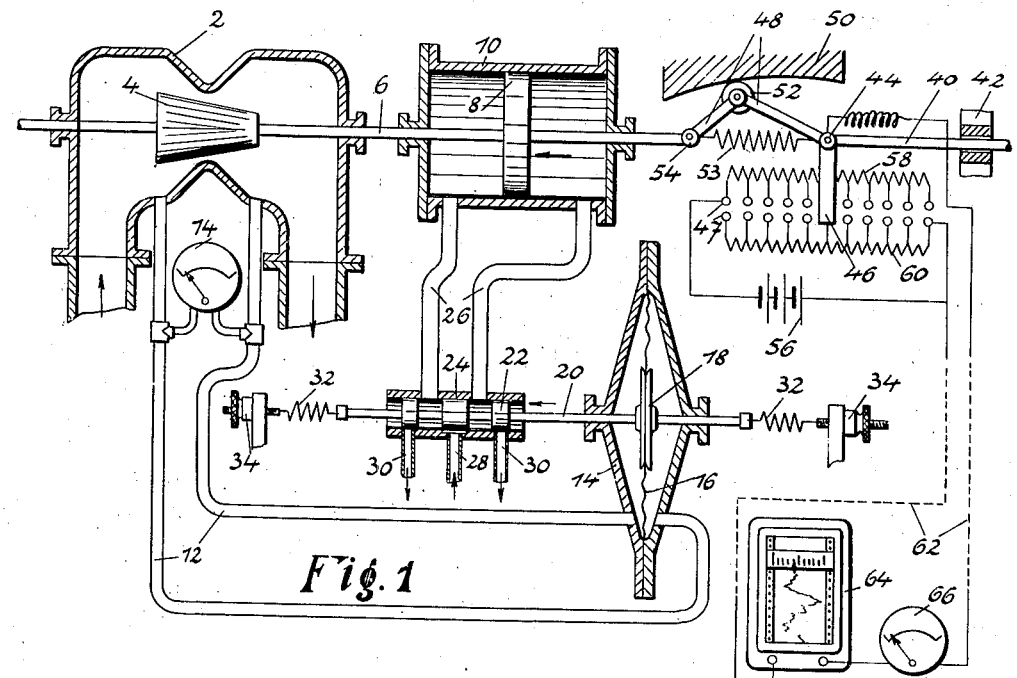

The flow meter shown in Figure 1 of the drawings includes a conduit or casing 2 through which flows the fluid to be measured, said conduit being provided with a fluid flow resistance device 4 mounted on a rod 6 actuated by a piston 8 movable in a cylinder 10 of a fluid motor.

The conduit 2 at opposite sides of the flow resistance device 4 is connected by pipes 12 to a diaphragm casing 14 at opposite sides of a diaphragm 16, so that said diaphragm is sensitive to or actuated by differences in pressure on opposite sides of the said flow resistance device. The diaphragm 16 is provided with a rod 20 connected to a valve piston 22 movable in a cylinder 24 of a governor valve for controlling the flow of auxiliary fluid to and from the pilot motor 8, 10. The diaphragm 16 is balanced between springs 32 connected between the rod 20 at opposite sides of the diaphragm and adjusting screws 34 mounted in fixed supports. A pressure gage 14 is connected between the pipes 12 to indicate the pressure in the conduit 2 for the purpose of proper adjustment of the tension of the springs 32.

When the flow meter is in balanced condition, the valve piston 22 is in its neutral or closed position and prevents the flow of fluid to or from the pilot motor 8, 10. Upon differences in pressure at opposite sides of the flow resistance device 4, the diaphragm 16 is actuated in one direction or the other and in turn moves the valve piston 22 in one direction. Fluid is thus admitted from a supply pipe 28 to one side of the piston 8 and from the other side thereof through an outlet pipe 30. The said piston is thus moved in one direction and moves the flow resistance device 4 to vary the flow of fluid through the conduit 2 and restore the meter to a balanced condition. The position of the flow resistance device 4 is a function of the magnitude of flow of fluid through the conduit 2.

For the purpose of transmitting the measuring movements of the flow meter to a point remote from the meter, the rod 6 of the piston 8 is pivotally connected at 54 to one end of one of a pair of links 48 pivotally connected and carrying a roller 52 which engages a curved guide 50. The opposite end of the other of said links 48 is pivotally connected at 44 to a guide rod 40 slidably mounted in a fixed support 42. The said guide rod 40 carries a contact member or brush 46 which engages the contact points 47 of two electrical resistances 58 and 60, the first of which is connected in series with a source of electricity 56 and electric recording, indicating and integrating instruments 64, 66 and 68, respectively. The other resistance 60 is connected in parallel in said circuit. The resistances 58 and 60 are of necessity adjacent the flow meter, but they may be connected by wires 62 to the indicating, recording and integrating instruments or other devices which may be located at points remote from the flow meter. A spring 53 is connected between the links 48 to maintain the roller 52 in engagement with the curved guide 50.

With this construction the contact brush 46 is moved in accordance with the flow resistance device 4 and varies the resistance of the resistance devices 58 and 60 so that the current passing through the instruments 64, 66 and 68 is varied in accordance with the movement of the flow resistance device 4, and is a measure of the flow of fluid through the conduit 2. The particular purpose of the links 48, roller 52 and guide 50 is to permit easy and quick adjustment of the apparatus in case error is found in the operation thereof due to faulty construction or to worn parts in the flow resisting device, the sensitive means, or the measuring devices 64, 66 and 68. For instance, if the measuring devices should fail to properly indicate or measure the flow of fluid, the apparatus may be adjusted to correct the error by changing the shape of the guide 50 or the lengths of the links 48. The guide 50 is easy to handle and changeable and avoids the necessity of disassembling the other and more delicate parts of the apparatus, which is sometimes practically impossible. Furthermore, the curved guide 50 may be such as to produce a special and definite relation between the magnitude of the flow of fluid and the indications in the instrument 64, 66 and 68, or other apparatus which may be actuated by the current from the source 56 for controlling other devices in a particular relation to the magnitude of flow of fluid. In other words, the guide 50 and links 48 may, as in the present instance, serve to compensate the difference in the law of variation of the flow of fluid and the law of variation of electric current so that the instruments 64, 66 and 68 accurately indicate the magnitude of flow of fluid.

Figure 2:
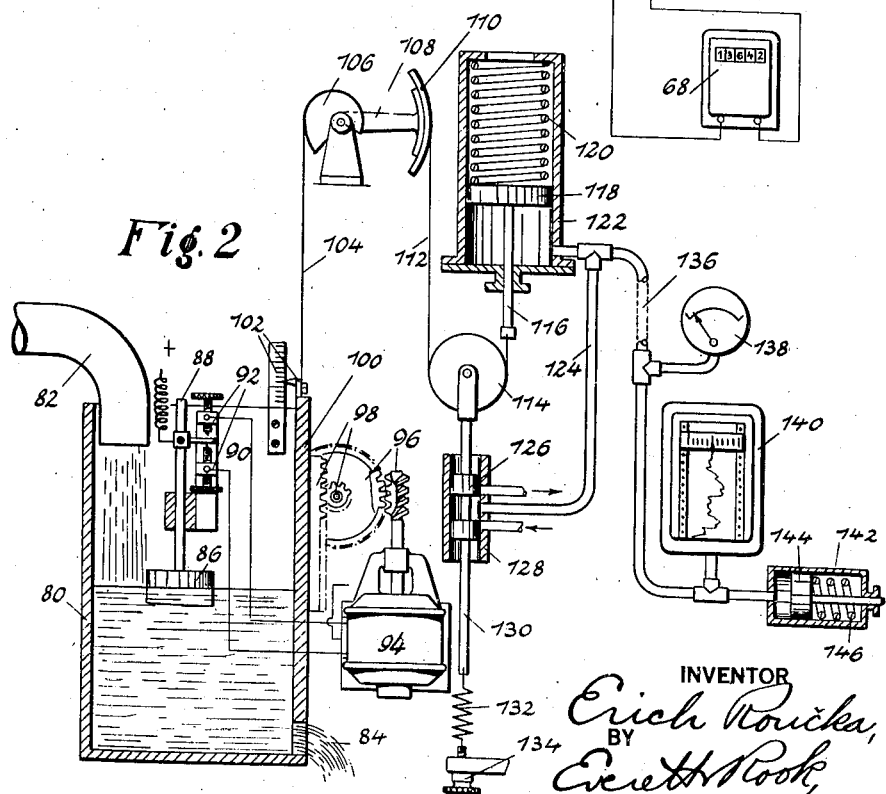
Figure 2 is a similar view showing a liquid flow meter embodying my invention.

In Figure 2 of the drawings is shown a device for measuring the velocity of flow of liquid from a container 80 to which the liquid is supplied by a pipe 82. The flow of liquid from said container is controlled by a flow resistance device or gate 100 actuated by an electric pilot motor 94 through suitable worm gearing 96 and pinion and rack gearing 98. The flow resistance device 100 is actuated in accordance with the rise and fall of the level of the liquid in the container 80, and for this purpose I may utilize a float 86 having a rod 80 carrying a contact arm 90 cooperating with opposed contact screws 92, the said contact arm and said screws being connected in an electric circuit with said pilot motor 94. When the level of the liquid in the container 80 rises or falls, the float 86 is moved in one direction or the other and causes engagement of the contact arm with one of the contact screws 92. The pilot motor 94 then rotates in one direction and raises or lowers the flow resistance device 100 to vary the outflow of liquid from the said container. A function of the position of the flow resistance device 100 is a measure for the velocity of flow of fluid from the container, and to indicate the same the resistance device may be provided with a pointer cooperating with a scale, as indicated at 102.

For transmitting the measuring movements of the flow resistance device 100, I may utilize a fluid under pressure, the pressure of which is varied in accordance with the movements of the flow resistance device. Thus, I may provide a cylinder 122 having a piston 118 mounted therein and adapted to be actuated in one direction by fluid under pressure controlled by a governor valve including a piston 126 mounted in a cylinder 128. The piston 118 is actuated in the opposite direction against the fluid pressure by a spring 120. The valve piston 126 carries a roller 114 around which passes a flexible member 112, one end of which is connected to the rod 116 of the piston 118 and the other end of which is connected to a segmental arm 110 of a lever 108 pivotally connected at its other end and carrying a cam 106 to which is connected one end of a flexible member 104, the other end of which is connected to the flow resistance device 100. The governor valve piston 126 is influenced in one direction by the piston 118 and in the other direction by a spring 132 connected by an adjusting screw 134 to a fixed support. Upon movement of the flow resistance device 100, the valve piston 126 is moved through the cam 106 and lever 108 in one direction or the other. Fluid is then admitted to or exhausted from the cylinder 122 through a pipe 124 and the piston is either moved in one direction by the fluid pressure or in the other direction by the spring 120. The fluid pressure in the cylinder 122 is thus varied in accordance with the movements of the flow resistance device 100.

For measuring the fluid pressure in the cylinder 122 at a point remote from the flow meter, I may connect said cylinder by a pipe line 136 to indicating and recording instruments 138 and 140, respectively, which may be placed at any desired point. I may also connect a cylinder 142 having a piston 144 therein to the pipe 136 for special other desired purposes, for instance for controlling any other device in accordance with the flow of liquid from the container 80. The piston 144 is moved in one direction by the fluid pressure and in the other direction by a spring 146. The cam 106 produces a special and definite relation between the flow of liquid from the container 80 and the pressure of the fluid in the cylinder 122, and serves a purpose similar to the curved guide 50 and links 48 of the construction shown in Figure 1.

Figure 3 shows a liquid flow meter in which mechanical remote transmitting means is utilized. The flow meter comprises a conduit or pipe 160 through which flows the fluid to be measured. A casing 170 is arranged in the pipe 160 in the path of the flowing fluid, and a flow resistance device 164 similar to the well-known butter-fly valve is mounted in the casing 170 on a shaft 166 so as to swing on said shaft at an angle to the direction of the flow of the fluid. The shaft 166 projects from the casing 170 and is provided with a segmental rack 168 meshing with a straight rack mounted on a rod 172 of a pilot motor. The conduit 160 is connected at opposite sides of the flow resistance device 164 by pipes 182 to a diaphragm chamber 184 at opposite sides of a diaphragm 186. The said diaphragm is connected to the valve piston 180 mounted in a cylinder 178 of a governor valve for controlling the flow of auxiliary fluid to and from the said pilot motor. The said valve piston and diaphragm are balanced between springs 188 which are connected by adjusting screws 190 to fixed supports.

The diaphragm 186 is thus sensitive to or actuated by differences in pressure at opposite sides of the flow resistance device 164. When the flow meter is in balanced condition the valve piston 180 is in its neutral position and prevents the flow of fluid to or from the pilot motor. Upon variations in the pressure at opposite sides of the flow resistance device 164, the diaphragm 186 is actuated in one direction or the other and moves the valve piston 180 to permit the flow of fluid to one side of the piston 174 and from the other side thereof. The said piston is then moved in one direction, and, through the gearing 168, rotates the shaft 166 and moves the flow resistance device 164 to vary the flow of fluid through the conduit 160. Balance is thus restored in the meter.

For transmitting the measuring movements of the meter to a point remote therefrom, I may mount an arm 192 on the shaft 196 and provide said arm with a cam surface 194 to opposite ends of which are connected the ends of flexible bands or strips 208 which pass over guide pulleys 200, 202 and 204 mounted in a bracket 206 adjacent the flow meter and also over other guide pulleys 210 and 212 at points remote from the flow meter. When the remote transmission is for the purpose of indicating the flow of fluid, the other ends of the flexible member 208 may be connected by screws 221 and 223 to the periphery of a drum 222 mounted on a shaft 227 in fixed supports. The said shaft 227 may be provided with an arm 224 carrying a pen point 228 to cooperate with a record strip 226 to record the flow of fluid through the conduit 160. Between the guide rollers 210 and 212 and the drum 222, weights 220 are mounted by means of a bracket and rollers 214 on the flexible members 208 for keeping the said members under constant tension and to compensate for the variation in the length of the bands caused by temperature, etc. It will be understood that as the arm 192 is swung the flexible members 208 will be pulled over the cam surface 194 of said lever and will rotate the drum 222 so as to cause a movement of the pen point 228 over the record strip 226. The cam surface 194 of the lever 192 produces a special and definite relation between the flow of fluid and the movement of the drum 222, and serves a purpose similar to the curved guide 50 and links 48 of the construction shown in Figure 1.

It will be observed that in all of the constructions illustrated, the pilot motors both actuate the flow resisting members 4, 100 and 164 and control actuation of the means for making indications of variations in the flow of fluid, for instance the instruments 64, 66 and 68, and 138, 140 and 142, and 222—226, respectively. This is an important feature of the invention, since it avoids special apparatus for actuating the means for making indications. This advantage will be more clearly understood when it is realized that considerable power is necessary for actuation of the flow resisting members, while a relatively small amount of power is necessary to actuate the means for making indications. While I have shown several different mechanisms, it will be understood that this is mainly for the purpose of illustrating the principles of the invention and that other mechanisms may be used and the details of construction modified or changed without departing from the spirit or scope of the invention. Therefore, I do not wish to be understood as retricting myself except as required by the following claims when construed in the light of the prior art. There are certain novel and improved features of construction above described which are not herein claimed but such features are described and claimed in my copending application Serial No. 420,787, filed October 30, 1920.

Having thus described the invention, what I claim is:

1. A fluid flow measuring device, comprising a fluid flow resistance means variable as a function of the magnitude of flow of fluid therethrough, means for making indications by auxiliary energy of the variations in the flow of fluid through said flow resistance means, a pilot motor, means for producing both actuation of said flow resistance means and control of said second-mentioned means by said pilot motor, means sensitive to a fluid condition caused by flow of fluid through said flow resistance means, and a governor for said pilot motor controlled by said sensitive means.

2. A fluid flow measuring device, comprising a fluid flow resistance means variable as a function of the magnitude of flow of fluid therethrough, means remotely disposed with respect to said flow resistance means for making indications of the variations in the flow of fluid through said flow resistance means, a pilot motor, means for connecting said pilot motor to said flow resistance means to cause actuation thereof by said motor, means actuated by said motor for controlling actuation of said second-mentioned means simultaneously with the actuation of said flow resistance means, means sensitive to a fluid condition caused by flow of fluid through said flow resistance means, and a governor for said pilot motor controlled by said sensitive means.

3. A fluid flow measuring device, comprising a fluid flow resistance means variable as a function of the magnitude of flow of fluid therethrough, means remotely disposed with respect to said flow resistance means and actuated by auxiliary energy for making indications of the variations in the flow of fluid through said flow resistance means, a pilot motor, means for connecting said pilot motor to said flow resistance means to cause actuation of the latter by said pilot motor, means actuated by said pilot motor for controlling the auxiliary energy for actuating said second-mentioned means, means sensitive to a fluid condition caused by flow of fluid through said flow resistance means, and a governor for said pilot motor controlled by said sensitive means.

4. A fluid flow measuring device, comprising a fluid flow resistance means variable as a function of the magnitude of flow of fluid therethrough, means remotely disposed with respect to said flow resistance means and actuated by electric energy for making indications of the variations in the flow of fluid through said flow resistance means, a pilot motor, means for connecting said pilot motor to said flow resistance means to cause actuation of the latter by said pilot motor, means actuated by said pilot motor simultaneously with the actuation of said flow resistance means for controlling the electric energy for actuating said second-mentioned means, means sensitive to a fluid condition caused by flow of fluid through said flow resistance means, and a governor for said pilot motor controlled by said sensitive means.

5. A fluid flow measuring device, comprising a fluid flow resistance means variable as a function of the magnitude of flow of fluid therethrough, means for making indications of the variations in flow of fluid therethrough, a pilot motor, means for connecting said pilot motor to said flow resistance means to cause actuation of the latter by said pilot motor, means for producing actuation of said second-mentioned means by said motor in a special and definite relation to the actuation of the flow resistance means, means sensitive to a fluid condition caused by flow of fluid through said flow resistance means, and a governor for said pilot motor controlled by said sensitive means.

6. A fluid flow measuring device, comprising a fluid flow resistance means variable as a function of the magnitude of flow of fluid therethrough, means for making indications of the variations in flow of fluid therethrough, a pilot motor, means for connecting said pilot motor to said flow resistance means to cause actuation of the latter by said pilot motor, means for producing actuation of said second-mentioned means by said pilot motor, means between said motor and said second-mentioned means for varying actuation of the later to produce special and definite relation between the actuation of said flow resistance means and said second-mentioned means, means sensitive to a fluid condition caused by flow of fluid through said flow resistance means, and a governor for said pilot motor controlled by said sensitive means.

7. A fluid flow measuring device, comprising a fluid flow resistance means variable as a function of the magnitude of flow of fluid therethrough, means remotely disposed with respect to said flow resistance means and actuated by auxiliary energy for making indications of the variations in the flow of fluid through said flow resistance means, a pilot motor, means for connecting said pilot motor to said flow resistance means to cause actuation of the latter by said pilot motor, means actuated by said pilot motor for controlling the auxiliary energy for actuating said second-mentioned means, means for varying the actuation of said last-mentioned means by said motor to produce a special and definite relation between the variations in the magnitude of flow of fluid and the variations in said auxiliary energy, means sensitive to a fluid condition caused by flow of fluid through said flow resistance means, and a governor for said pilot motor controlled by said sensitive means.

8. A fluid flow measuring device, comprising a conduit for the flow of fluid having an orifice therein, a flow resisting member movable in said orifice to vary the same, the position of said flow resisting member being a function of the magnitude of flow of fluid, a pilot motor for actuating said flow resisting member, a source of auxiliary energy, means to be actuated by said auxiliary energy in accordance with variations in the flow of fluid, means actuated by said pilot motor to control the auxiliary energy for actuating said last-mentioned means, means sensitive to a fluid condition caused by flow of fluid through said flow resistance means, and a governor for said pilot motor controlled by said sensitive means.

E. ROUČKA.